United States Patent [19]

Spence-Bate

[11] 3,935,583

[45] Jan. 27, 1976

[54] APPARATUS FOR MAKING MICROFICHES

[76] Inventor: Harry A. H. Spence-Bate, 115 Cheam Place, P.O. Box 8, Morley, Western Australia, 6062

[22] Filed: Mar. 22, 1974

[21] Appl. No.: 453,797

[52] U.S. Cl. .................... 354/292; 355/75; 355/79; 353/35

[51] Int. Cl.[2] .......................................... G03B 15/00

[58] Field of Search ......... 354/292; 40/135; 355/75, 355/79

[56] References Cited

UNITED STATES PATENTS

| | | | |
|---|---|---|---|
| 240,374 | 4/1881 | Brigham | 355/79 |
| 666,788 | 1/1901 | Aberli | 354/292 |
| 1,736,445 | 11/1929 | Jannenga | 354/292 X |
| 3,014,302 | 12/1961 | Hughes | 354/292 X |
| 3,499,377 | 3/1970 | Esses | 354/292 |
| 3,524,703 | 8/1970 | Wright | 353/35 |
| 3,574,459 | 4/1971 | Hartwig | 355/66 |

*Primary Examiner*—John M. Horan
*Attorney, Agent, or Firm*—Fidelman, Wolffe & Leitner

[57] ABSTRACT

A method and apparatus for producing a composite microfiche including a first emulsion bearing lamina on which one or more permanent data image frames are located and a second emulsion bearing lamina on which one or more updating data image frames are located, wherein the image or images on the first lamina are inverted and in different planar positions with respect to the image or images on the second lamina such that when the emulsion on the first lamina is superimposed on the emulsion on the second lamina, the laminae can be read together as one microfiche, the images appearing in the different planar positions in a substantially common focal plane.

A three-reflective surface microfiche image inverter is also provided.

10 Claims, 3 Drawing Figures

APPARATUS FOR MAKING MICROFICHES

BACKGROUND OF THE INVENTION

1. Field of the Invention

This invention relates generally to microfiches and microfiche cameras and more specifically to an improved microfiche and camera for producing said microfiches.

Description of the Prior Art

A microfiche camera is shown in my United States patent application No. 348,622, filed Apr. 4, 1973. In this patent, there is shown a lens turret mechanism having positions for different lenses, each of which has a different purpose. Several purposes were proposed and it became clear that the turret would prove a good platform for mounting lenses for other undiscovered purposes.

During development of the camera, a problem arose concerning the product of microfiches which could be updated. Current updating is done by leaving blank spaces on a microfiche and then manually fixing individual microfiche images in the blank spaces. Such a procedure is clearly time consuming and often inaccurate. Furthermore, refocussing for the different images was often necessary when reading the microfiche. A particular example of updating was for hospital purposes where an updatable fiche was required for medical data for a patient. A patent has various unchanging items of data such as blood group or color of eyes, and variable data such as blood count.

SUMMARY OF THE INVENTION

The invention therefor consists of a composite microfiche including a first emulsion bearing lamina on which one or more permanent date image frames are located and a second emulsion bearing lamina on which one or more updating data image frames are located, wherein the image or images on the first lamina are inverted and in different planar positions with respect to the image or images on the second lamina such that when the emulsion on the first lamina is superimposed on the emulsion on the second lamina, the laminae can be read together as one microfiche, the images appearing in the different planar positions in a substantially common focal plane.

An advantage of such an arrangement is that when the laminae are held together the emulsions are protected from damage by scratching from handling. Also, updating need only be carried out on one lamina.

The laminae may be provided with a means of aligning and retaining the two superimposed laminae together.

The invention further consists of a microfiche camera inverting device comprising three reflective surfaces, two of the surfaces being mounted at an angle of less than 270° and greater than 180° apart, and the third surface being perpendicular to the line bisecting the angle formed by the two surfaces facing said third surface and separate from said third surface such than an image projected parallel to the third surface onto one of the two surfaces is reflected onto the third surface and back onto the other of the two surfaces, thence off the said other of the two surfaces at an angle parallel to the third surface.

Such a device can be mounted so as to be easily moved into the photographic axis of the camera to enable updating images to be recorded on the second emulsion bearing lamina of the composite microfiche.

The updating laminae are conveniently known as complementary or auxiliary fiches while the first lamina is known as a permanent or master fiche.

Advantages of the complementary fiche are particularly evident in hospital use where permanent data is recorded on the first lamina while temporary or updating data is on the complementary fiche. For example, information which records a patient's whole medical history is treated as permanent historical fact and blank spaces would be left for continuations. The facts and the continuations together may constitute a group. Furthermore, groups may have their predetermined allocated geographical locations on a fiche so that not only can they be easily selected (the following blank spaces would provide for the case history to go on without the necessity of re-grouping), but also duplication can be made selective. When a diazo copy fiche is used for the medical record only, domestic circumstances can be left out or, vice versa, thus only passing on only required information.

A duplicator using a combination-mask can leave out a part or any parts of the information contained on a fiche. For instance, the master fiche contains all information, but the duplicates sent to various departments around the hospital only carry information necessary for them. In this way, privacy can be strictly maintained and information passed on a 'need to know' basis, though the master contains all information. This is very important as confidentiality of medical records is a very live issue and an advantage of the composite fiche system is that while computers suffer from errors which cannot easily be detected and securing or confidentiality is not easily maintained, the complementary fiches of the present invention have all the advantages of an updated file which can be checked, signed and countersigned as required. Also, the system guards against computer breakdown and difficulties in determining responsibilities.

The geographical location of certain matter on a composite fiche has the advantage not only of fast retrieval, as all information departments have specific places alloted to them on a fiche, but also privacy as, for example, a physiotherapist need not necessarily know the patient's domestic circumstances; in this case, such frames can be easily left out while duplicating. On the other hand, these images would be of paramount importance to the psychiatrist. Thus, although the fiche is an integral document, duplicate copies can be made very selective to suit the circumstances. Special symbols could also be used to be understood by the few.

OBJECTS OF THE INVENTION

An object of the present invention is the provision of a method and apparatus of making a composite microfiche which is economically updated.

Another object is to provide a microfiche with predetermined geographical locations of information or data.

A further object of the present invention is the provision of a microfiche which allows selective duplication of information stored thereon.

Still another object is to provide an apparatus for producing inverted images in a microfiche camera system.

A still further object is to provide a system for economically and efficiently updating microfiches, and thus alleviate the problems of the prior art.

Other objects, advantages and novel features of the present invention will become apparent from the following detailed description of the invention when considered in conjunction with the accompanying drawings.

DESCRIPTION OF THE PREFERRED EMBODIMENTS

Figure 1:
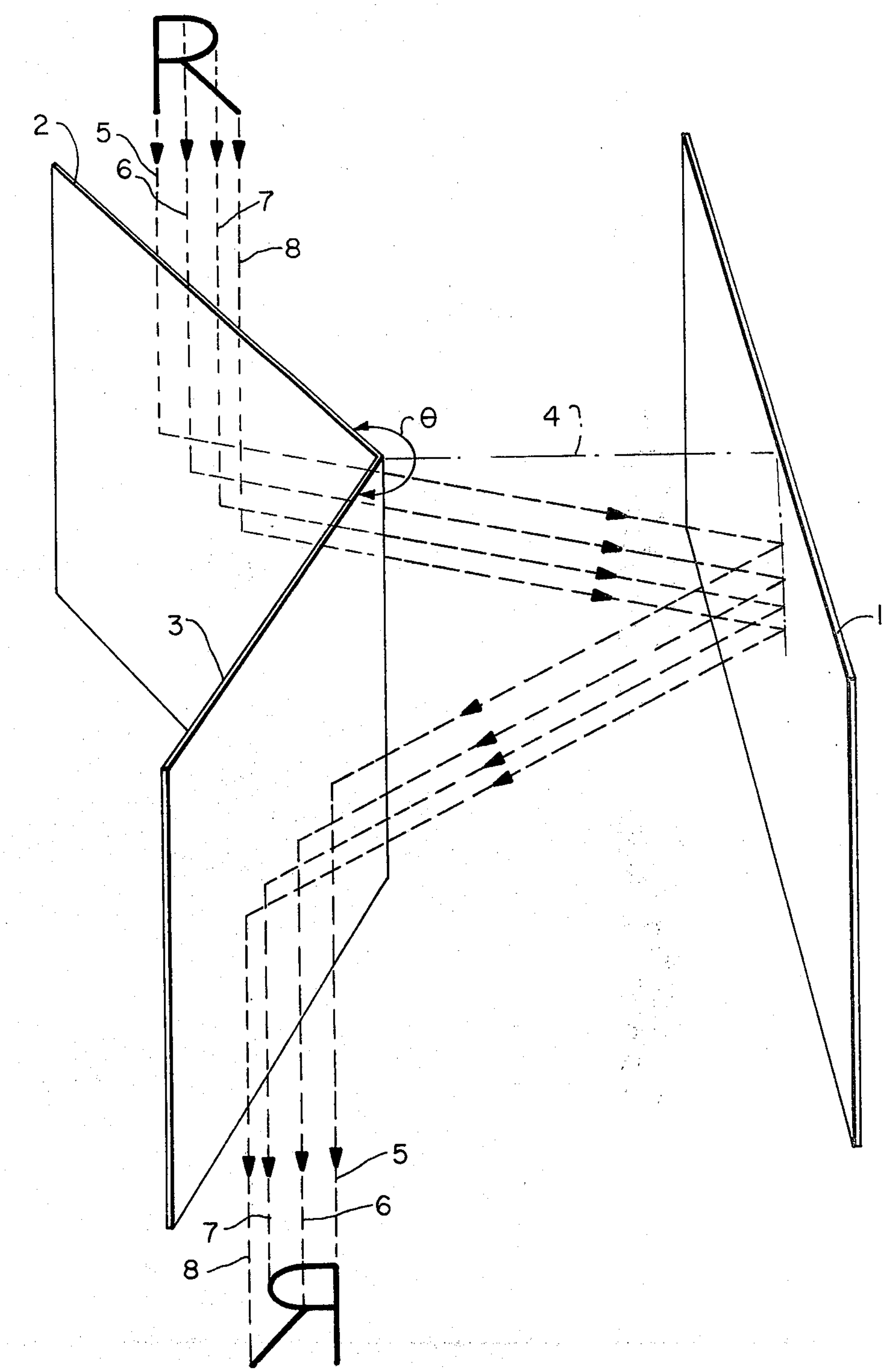
FIG. 1 shows an inverting device according to the present invention.

In FIG. 1, the inverting device of the present invention is shown consisting of three reflective surfaces, 1, 2 and 3. The two surfaces 2 and 3 are mounted to form an angle $\phi$ relative to each other, which should be between 180° and 270°. Surfaces 2 and 3 are positioned so that the angle $\phi$ is bisected by a perpendicular 4 to the third reflective surface 1. The angle $\phi$ in FIG. 1 is approximately 230°, for example. The reflective surface 1 faces the surfaces 2 and 3 so that a light ray 5 is reflected off surface 2 onto surface 1, thence onto surface 3 and off surface 3 in the same direction and parallel to the direction it started. It can also be seen by following the rays 5, 6, 7 and 8, that the letter R which enters at surface 2, for example, is inverted when leaving surface 3. The surface 1 is parallel to the incoming and outgoing rays 5–8.

Figure 2:
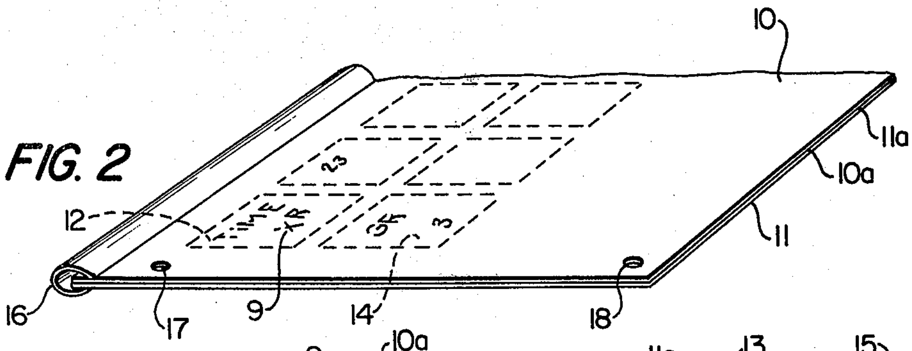
FIG. 2 shows a composite microfiche with the two laminae superimposed according to the invention.
Figure 3:
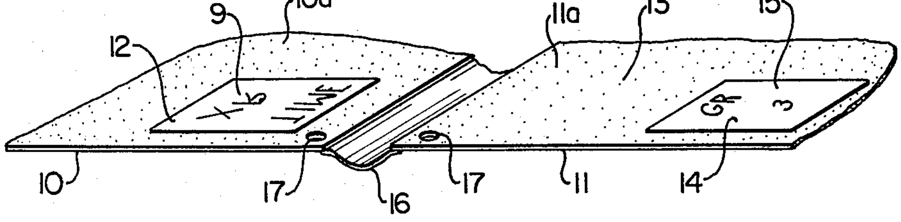
FIG. 3 shows part of the composite microfiche of FIG. 2 with the two laminae separated.

In FIG. 2, the same letter R can be seen at 9 on the upper, complementary, or updating lamina 10 of the composite microfiche formed from the superimposed laminae 10 and 11. The letter R is a part of a data image frame 12 which is formed from emulsion 10*a* on the side of lamina 10 which in FIG. 2 (the in use position) faces the emulsion side 11*a* of lamina 11. Thus, the stored data on emulsion sides of the laminae 10 and 11 are enclosed and protected from scratching or destruction from handling the composite microfiche. It can also be seen that the image frame 12 fits into a blank space or frame 13 on the lamina 11 on which permanent data is recorded (FIG. 3). The image frame 14 which is formed on the emulsion side 11*a* of lamina 11 is on a different planar position to that of the blank space 13 in which lies the image frame 12 when the laminae are together in the in use or superimposed position.

By comparison in FIG. 3 of the inverted R at 9 in image frame 12 with R at 15 in image frame 14, the necessity for inversion may be seen.

The updating lamina 10 is also known as an auxiliary or complementary fiche while the lamina 11 is known as a permanent or master fiche.

The reason for putting the emulsion 10*a* adjacent emulsion 11*a* is that the base material of the laminae, which is thick when compared with the thickness of the emulsion, is sufficient to protect the image of the emulsion from damage by scratches and abrasion. Because the thickness of the emulsion is so thin, the microfiche reader can be focussed on the interface between the emulsions and yet remain able to be effectively in focus on the opposed emulsions.

If required for certain purposes, the laminae may be permanently joined by means for retaining the two laminae together with a joiner so as to be watertight or joined by means consisting of a clip-like reinforcement edge or alternatively by a strip of adhesive tape such as shown in FIGS. 2 and 3 as 16. Holes 17 and 18 can be provided for aligning one lamina with respect to the other.

From the preceding description of the preferred embodiments, it is evident that the objects of the invention are attained and although the invention has been described and illustrated in detail, it is to be clearly understood that the same is by way of illustration and example only and is not to be taken by way of limitation. The spirit and scope of this invention are limited only by the terms of the appended claims.

What is claimed is:

1. A composite microfiche including a first lamina having an emulsion on a first surface, one or more permanent data image frames located on said first surface, a second lamina having an emulsion on a second surface, one or more updating data image frames located on said second surface, said first lamina being superimposed on said second lamina with said first surface against said second surface defining a plane, said permanent data frames being in different positions on said plane than said updating data frames, all of said images being in a substantially common focal plane and non-inverted relative to each other.

2. A composite microfiche as in claim 1 including means in each lamina for aligning said laminae when superimposed.

3. A composite microfiche as in claim 1 including means for joining said first and second lamina together at a juxtaposed edge and allowing rotational movement of said lamina relative to each other about said edge.

4. A composite microfiche as in claim 3 wherein said permanent data images are inverted with respect to said updating data images when said first and second lamina are in substantially the same plane.

5. A composite microfiche as in claim 3 wherein said joining means includes a strip of adhesive connecting said juxtaposed edges of said laminae.

6. A composite microfiche comprising a first lamina having a first image formed on a first surface, a second lamina having a second image formed on a second surface, means rotatably joining said first and second lamina at an edge so that said first image is inverted relative to said second image when said first lamina is substantially planar with said second lamina, and so that said first surface is against said second surface at a common focal plane and said first and second images are non-inverted relative to each other when said first lamina is superimposed on said second lamina.

7. A composite microfiche as in claim 6 wherein said first and second images are in different planar positions when said first and second laminae are superimposed.

8. A composite microfiche as in claim 6 including means in each lamina for aligning said laminae when superimposed.

9. A composite microfiche as in claim 6 wherein said joining means includes a strip of adhesive connecting said juxtaposed edges of said laminae.

10. A composite microfiche as in claim 6 wherein said first and second surfaces are emulsions and said first and second images are formed on said emulsions.

* * * * *